United States Patent
Hopkins et al.

(10) Patent No.: US 11,578,527 B2
(45) Date of Patent: Feb. 14, 2023

(54) IN-VEHICLE DEVICE FOR CONTROLLING A MOVABLE BARRIER OPERATOR

(71) Applicant: The Chamberlain Group LLC, Oak Brook, IL (US)

(72) Inventors: Garth Wesley Hopkins, Lisle, IL (US); Oddy Khamharn, Lombard, IL (US); Edward James Lukas, Batavia, IL (US); Mark Edward Miller, Middleton, WI (US)

(73) Assignee: The Chamberlain Group LLC, Oak Brook, IL (US)

( * ) Notice: Subject to any disclaimer, the term of this patent is extended or adjusted under 35 U.S.C. 154(b) by 73 days.

(21) Appl. No.: 16/923,534

(22) Filed: Jul. 8, 2020

(65) Prior Publication Data
US 2021/0010316 A1 Jan. 14, 2021

Related U.S. Application Data

(60) Provisional application No. 62/871,496, filed on Jul. 8, 2019.

(51) Int. Cl.
*E05F 15/77* (2015.01)
*H04W 4/44* (2018.01)
*G07C 9/00* (2020.01)

(52) U.S. Cl.
CPC .......... *E05F 15/77* (2015.01); *G07C 9/00896* (2013.01); *H04W 4/44* (2018.02); *G07C 2009/00928* (2013.01)

(58) Field of Classification Search
None
See application file for complete search history.

(56) References Cited

U.S. PATENT DOCUMENTS

| 5,555,502 A | 9/1996 | Opel |
| 5,899,956 A | 5/1999 | Chan |

(Continued)

FOREIGN PATENT DOCUMENTS

| CN | 106157567 | 11/2016 |
| WO | 1996035196 | 11/1996 |

OTHER PUBLICATIONS

USPTO; U.S. Appl. No. 16/212,109; Notice of Allowance dated Jan. 27, 2021; (pp. 1-8).

(Continued)

*Primary Examiner* — K. Wong
(74) *Attorney, Agent, or Firm* — Fitch, Even, Tabin & Flannery LLP

(57) ABSTRACT

In one aspect, an in-vehicle device is provided that includes a sensor configured to detect a vehicle characteristic indicative of the vehicle being in proximity to a location associated with a movable barrier operator. The in-vehicle device includes communication circuitry to communicate an open command to the movable barrier operator that causes the movable barrier operator to open a movable barrier connected to the movable barrier operator. A memory is configured to store a vehicle arrival condition indicative of whether the vehicle arrived at the location associated with the movable barrier operator. A processor is configured to determine satisfaction of the vehicle arrival condition and, upon the vehicle arrival condition not being satisfied, cause the communication circuitry to communicate a close command to the movable barrier operator that causes the movable barrier operator to close the movable barrier.

20 Claims, 7 Drawing Sheets

(56) References Cited

U.S. PATENT DOCUMENTS

| | | | |
|---|---|---|---|
| 6,158,655 A | 12/2000 | Devries, Jr. | |
| 6,166,698 A | 12/2000 | Turnbull | |
| 6,271,765 B1 | 8/2001 | King | |
| 6,400,956 B1 | 6/2002 | Richton | |
| 6,411,887 B1 | 6/2002 | Martens | |
| 6,476,732 B1 | 11/2002 | Stephan | |
| 6,487,495 B1 | 11/2002 | Gale | |
| 6,526,335 B1 | 2/2003 | Treyz | |
| 6,559,775 B1 | 5/2003 | King | |
| 6,615,132 B1 | 9/2003 | Nagasaka | |
| 6,690,268 B2 | 2/2004 | Schofield | |
| 6,707,421 B1 | 3/2004 | Drury | |
| 6,708,086 B2 | 3/2004 | Richard | |
| 6,711,474 B1 | 3/2004 | Treyz | |
| 6,737,968 B1 | 5/2004 | Ergun | |
| 6,791,472 B1 | 9/2004 | Hoffberg | |
| 6,812,942 B2 | 11/2004 | Ribak | |
| 6,856,820 B1 | 2/2005 | Kolls | |
| 6,940,492 B2 | 9/2005 | Maritzen | |
| 6,978,206 B1 | 12/2005 | Pu | |
| 6,988,026 B2 | 1/2006 | Breed | |
| 7,103,460 B1 | 9/2006 | Breed | |
| 7,158,881 B2 | 1/2007 | McCarthy | |
| 7,224,324 B2 | 5/2007 | Quist | |
| 7,257,426 B1 | 8/2007 | Witkowski | |
| 7,272,497 B2 | 9/2007 | Koshiji | |
| 7,298,289 B1 | 11/2007 | Hoffberg | |
| 7,386,318 B2 | 6/2008 | Moon | |
| 7,415,243 B2 | 8/2008 | Yuhara | |
| 7,440,845 B1 | 10/2008 | Laverick | |
| 7,532,965 B2 | 5/2009 | Robillard | |
| 7,999,721 B2 | 8/2011 | Orr | |
| 8,525,723 B2 | 9/2013 | Orr | |
| 8,611,919 B2 | 12/2013 | Barnes, Jr. | |
| 9,715,772 B2 | 7/2017 | Bauer | |
| 9,879,466 B1 | 1/2018 | Yu | |
| 9,984,561 B1* | 5/2018 | Swafford | G08C 17/02 |
| 9,986,435 B2 | 5/2018 | Potkonjak | |
| 10,127,384 B2 | 11/2018 | Shah | |
| 10,163,284 B2* | 12/2018 | Kirkland | G07C 9/28 |
| 10,490,007 B2 | 11/2019 | Lickfelt | |
| 10,557,299 B2 | 2/2020 | Lickfelt | |
| 10,563,456 B2* | 2/2020 | Bodurka | E06B 9/68 |
| 10,616,713 B1* | 4/2020 | Yu | H04W 12/64 |
| 10,748,365 B2 | 8/2020 | Kirkland | |
| 10,873,828 B2 | 12/2020 | Lau | |
| 11,028,633 B2* | 6/2021 | Fitzgibbon | E05F 15/73 |
| 2002/0055924 A1 | 5/2002 | Liming | |
| 2002/0085043 A1 | 7/2002 | Ribak | |
| 2002/0147006 A1 | 10/2002 | Coon | |
| 2002/0173889 A1 | 11/2002 | Odinak | |
| 2002/0193946 A1 | 12/2002 | Turnbull | |
| 2003/0006888 A1 | 1/2003 | Burchette | |
| 2003/0007261 A1 | 1/2003 | Hutzel | |
| 2003/0055557 A1 | 3/2003 | Dutta | |
| 2003/0182026 A1 | 9/2003 | Awada | |
| 2003/0197594 A1 | 10/2003 | Olson | |
| 2003/0197595 A1 | 10/2003 | Olson | |
| 2004/0034455 A1 | 2/2004 | Simonds | |
| 2004/0093154 A1 | 5/2004 | Simonds | |
| 2004/0110472 A1 | 6/2004 | Witkowski | |
| 2004/0158371 A1 | 8/2004 | Iggulden | |
| 2004/0246607 A1 | 12/2004 | Watson | |
| 2004/0257199 A1 | 12/2004 | Fitzgibbon | |
| 2005/0168321 A1 | 8/2005 | Fitzgibbon | |
| 2006/0041373 A1 | 2/2006 | Rowe | |
| 2006/0050018 A1 | 3/2006 | Hutzel | |
| 2006/0184456 A1 | 8/2006 | de Janasz | |
| 2006/0202815 A1 | 9/2006 | John | |
| 2010/0171588 A1 | 7/2010 | Chutorash | |
| 2011/0193700 A1 | 8/2011 | Fitzgibbon | |
| 2013/0117078 A1 | 5/2013 | Weik, III | |
| 2013/0147600 A1 | 6/2013 | Murray | |
| 2013/0147616 A1 | 6/2013 | Lambert | |
| 2013/0179238 A1 | 7/2013 | Warner, IV | |
| 2014/0118111 A1 | 5/2014 | Saladin | |
| 2015/0096693 A1 | 4/2015 | Fitzgibbon | |
| 2015/0137941 A1 | 5/2015 | Bauer | |
| 2015/0228134 A1 | 8/2015 | Tehranchi | |
| 2016/0337815 A1 | 11/2016 | Cuddihy | |
| 2017/0154482 A1 | 6/2017 | Osborne | |
| 2017/0176961 A1 | 6/2017 | Tirpak | |
| 2018/0268238 A1 | 9/2018 | Khan | |
| 2019/0048639 A1 | 2/2019 | Lickfelt | |
| 2019/0048644 A1 | 2/2019 | Lickfelt | |
| 2019/0180124 A1 | 6/2019 | Schindler | |
| 2019/0188936 A1* | 6/2019 | Sivill | E05F 15/76 |
| 2019/0200225 A1 | 6/2019 | Fitzgibbon | |
| 2019/0244448 A1 | 8/2019 | Alamin | |
| 2020/0117154 A1* | 4/2020 | Edwards | G05B 19/042 |
| 2020/0181969 A1 | 6/2020 | Fitzgibbon | |
| 2020/0236552 A1 | 7/2020 | Fitzgibbon | |
| 2020/0240198 A1 | 7/2020 | Cate | |
| 2020/0242862 A1 | 7/2020 | Cate | |
| 2020/0374122 A1 | 11/2020 | Naiki | |
| 2021/0246707 A1 | 8/2021 | Fitzgibbon | |

OTHER PUBLICATIONS

USPTO; U.S. Appl. No. 16/212,109; Office Action dated Oct. 14, 2020; (pp. 1-13).

Integrating GPS data within embedded Internet GIS; Arunas Stockus, Alain Bouju, Frédéric Bertrand, Patrice Boursier; "GIS '99: Proceedings of the 7th ACM international symposium on Advances in geographic information systems, pp. 134-139; Date of Publication: Nov. 1999"; https://doi.org/10.1145/320134.320168.

Intelligent pervasive middleware for context-based and localized telematics services; Chatschik Bisdikian, Isaac Boamah, Paul Castro, Archan Misra, Jim Rubas, Nicolas Villoutreix, Danny Yeh, Vladimir Rasin, Henry Huang, Craig Simonds; "WMC '02: Proceedings of the 2nd international workshop on Mobile commerce, pp. 15-24; Date of Publication: Sep. 2002"; https://doi.org/10.1145/570705.570710.

Interfaces, autonomy, & interactions in automobile driving; Erwin R. Boer, Michael A. Goodrich; "CHI EA '04: CHI '04 Extended Abstracts on Human Factors in Computing Systems, pp. 1578-1579; Date of Publication: Apr. 2004"; https://doi.org/10.1145/985921.986153.

Next century challenges: Nexus—an open global infrastructure for spatial-aware applications; Fritz Hohl, Uwe Kubach, Alexander Leonhardi, Kurt Rothermel, Markus Schwehm; "MobiCom '99: Proceedings of the 5th annual ACM/IEEE international conference on Mobile computing and networking, pp. 249-255 Date of Publication: Aug. 1999"; https://doi.org/10.1145/313451.313549.

Towards scalable location-aware services: requirements and research issues; Mohamed F. Mokbel, Walid G. Aref, Susanne E. Hambrusch, Sunil Prabhakar; "GIS '03: Proceedings of the 11th ACM international symposium on Advances in geographic information systems, pp. 110-117; Date of Publication: Nov. 2003"; https://doi.org/10.1145/956676.956691.

U.S. Appl. No. 17/241,562; Office Action dated Jul. 19, 2022; (pp. 1-29).

USPTO; U.S. Appl. No. 17/241,562; Notice of Allowance and Fees Due (PTOL-85) dated Nov. 7, 2022; (pp. 1-16).

* cited by examiner

IN-VEHICLE DEVICE FOR CONTROLLING A MOVABLE BARRIER OPERATOR

CROSS-REFERENCE TO RELATED APPLICATION

This application claims the benefit of U.S. Provisional Patent Application No. 62/871,496, filed Jul. 8, 2019, which is incorporated by reference in its entirety herein.

FIELD

The subject matter of this application relates to movable barrier operators and, more particularly, to in-vehicle devices for controlling movable barrier operators.

BACKGROUND

Various types of remote controls for movable barrier operators are known in the art for controlling the position of a movable barrier associated with the movable barrier operator such as a radio frequency transmitter. The transmitter may be part of or connected to in-vehicle hardware, such as an infotainment or navigation system, that allows a user to set a geographic area associated with the user's home such that the transmitter will transmit a signal to open or close the movable barrier upon the vehicle entering or exiting the area. In this manner, the user does not need to manually actuate the transmitter each time the vehicle enters or exits the area.

Figure 1:
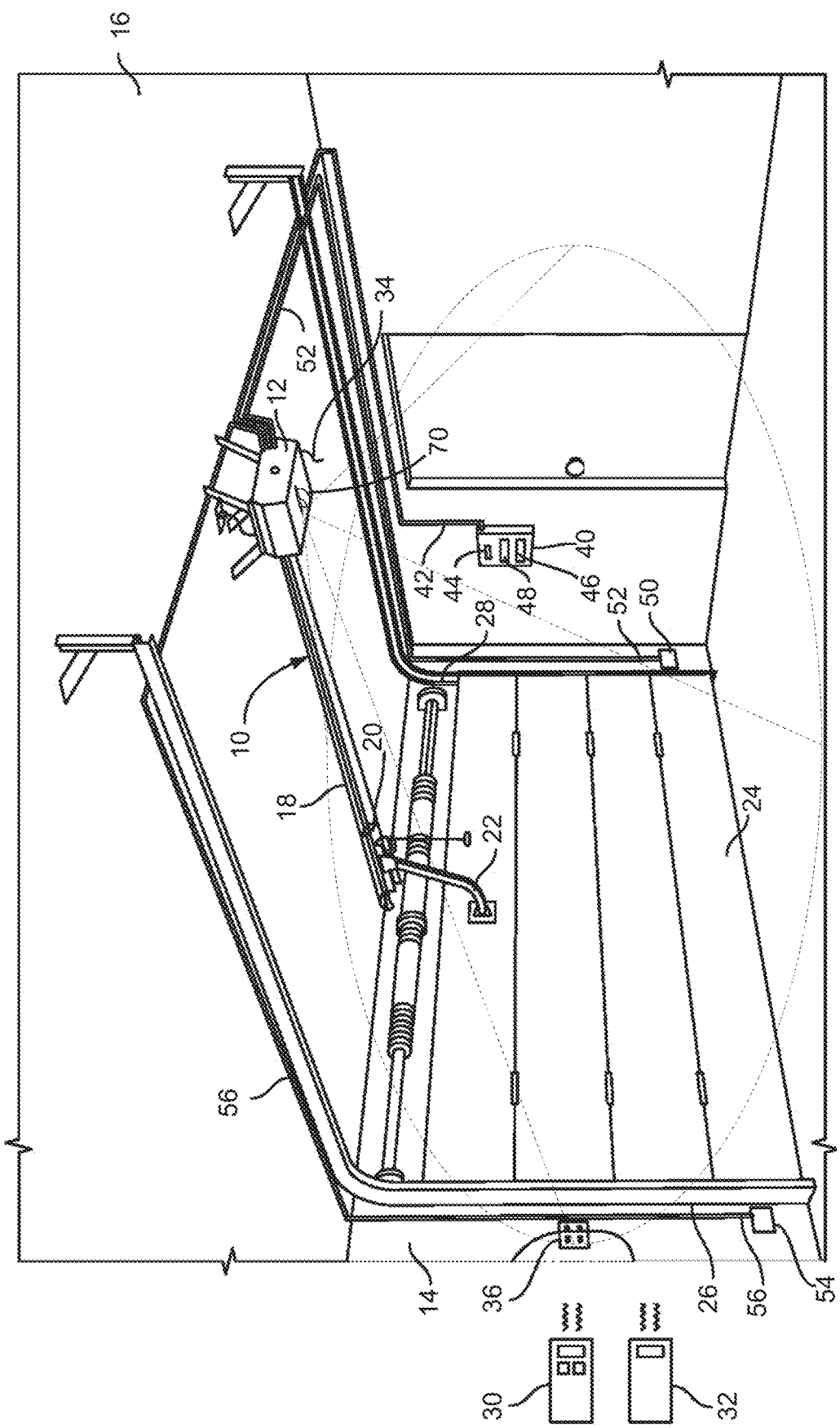
FIG. 1 is a perspective view of a garage that includes an example movable barrier operator and a passageway door.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated.

DETAILED DESCRIPTION

In accordance with one aspect of the present disclosure, a system is provided for controlling access to a secured area. The system may include a first movable barrier operator configured to control movement of a first movable barrier, a second movable barrier operator configured to control movement of a second movable barrier, and a server computer in communication with the first and second movable barrier operators. The system further includes a remote control configured to communicate with the movable barrier operators and/or the server computer. The remote control may include, for example, a device associated with a vehicle.

The remote control and/or the server computer may communicate a state change request to one or more of the movable barrier operators upon a satisfaction of one or more vehicle parameters. The vehicle parameters may include, for example, the proximity of the remote control relative to the secured area, the speed of the vehicle, and the direction of travel of the vehicle.

The server computer, remote control, and/or movable barrier operators include one or more processors configured to select a movable barrier operator from among the first and second movable barrier operators to operate in response to the state change request. The movable barrier operator may be selected at least in part based upon a behavior profile associated with a user. The behavior profile may be compiled at least in part based upon historical data (e.g., the user's prior operation of the movable barrier operators). For example, the particular user typically operates a particular movable barrier operator at a particular time (e.g., at 6 P.M.) on a particular day of the week (e.g., Monday).

Upon selecting the movable barrier operator from among the first and second movable barrier operators to operate, the system may perform an obstacle detection process. The obstacle detection process may be performed, for example, using a camera directed at an area associated with the selected movable barrier. In response to detecting an obstacle (e.g., another vehicle) at the area associated with the selected movable barrier, one or more of the server computer, remote control, and movable barrier operators may operate a movable barrier operator different than the initially-selected movable barrier operator.

In another aspect of the disclosure, a method is provided for operating a movable barrier operator. The method includes determining satisfaction of a predetermined relative proximity of the in-vehicle device relative to a movable barrier operator. If the relative proximity determination is satisfied, the method may include transmitting a control command (e.g., an open or close command) via RF transmission or other short-range transmission. If the relative proximity determination is not satisfied, the method may include transmitting a command via a wide area transmission.

Referring now to FIG. 1, a garage 14 having a movable barrier operator system 10 is shown. The movable barrier operator system 10 may include a movable barrier operator 12. Examples of movable barrier operators 12 include chain or belt-driven garage door openers, gate operators, roller shutter systems, and jackshaft garage door operators.

The movable barrier operator 12 may be mounted within a secured area, such as within the garage 14. More specifically, the movable barrier operator 12 may be mounted to a ceiling 16 of the garage 14. The movable barrier operator 12 may include, or may be connected to, a rail 18. A releasable trolley 20 may be attached to the rail 18. The releasable trolley 20 may have an arm 22 extending to a movable barrier, such as a multiple-paneled garage door 24, positioned for movement along a door tracks 26 and 28. The movable barrier operator 12 may have a motor configured to open and close the garage door 24 via a coupling such as a belt, chain or screw shaft, the trolley 20, and the arm 22. Operation of the motor produces movement of the garage door 24. Although described herein as a garage door 24, other forms of movable barriers may be controlled by the movable barrier operator 12.

The movable barrier operator 12 may also include circuitry such as, for example, processing circuitry 72 (FIG. 2) with a processor and a non-transitory computer readable memory to control the motor and manage other hardware and/or software features. The movable barrier operator system 10 may include one or more remote controls. The processing circuitry 72 of the movable barrier operator 12 may be configured to determine whether to operate in response to commands from the remote controls. The one or more remote controls may include portable transmitter units 30, 32 configured to send radio frequency control commands for reception by communication circuitry including an antenna 34 of the movable barrier operator 12. The remote controls may also include an external control pad 36, with a button or buttons thereon, that may be positioned on the outside of the garage 14. The external control pad 36 may communicate control commands via radio frequency transmission for reception by the antenna 34 of the movable barrier operator 12. Other examples of remote controls include user devices such as smartphones, tablet computers, personal computers, and wearable devices (e.g., smartwatches) that are operable to control operation of the movable barrier operator 12 over the internet via a server computer.

A wall control or switch module 40 is connected to the movable barrier operator 12 by one or more wires 42. In another aspect, the switch module 40 may communicate with the movable barrier operator 12 wirelessly or via a combination of wired and wireless signals. The switch module 40 may include one or more of a light switch 44, a lock switch 46, and a command switch 48.

An optical emitter 50 may be connected via a power and signal line 52 to the movable barrier operator 12. An optical detector 54 may be connected via a line 56 to the movable barrier operator 12. Alternatively, at least one of the optical emitter 50 and the optical detector 54 may communicate wirelessly with the movable barrier operator 12. Furthermore, the optical emitter 50 and the optical detector 54 may be combined as a single unit (e.g., as a retroreflector).

The movable barrier operator 12 may communicate via wired or wireless protocols with one or more remote controls and/or one or more remote devices. The movable barrier operator 12 includes communication circuitry 74 (FIG. 2), which may include a receiver, transmitter, and/or a transceiver. The communication circuitry 74 may be configured to communicate via one or more approaches, such as radio frequency communications utilizing different frequencies and one or more protocols. For example, the communication circuitry 74 may communicate via 300 MHz-400 MHz radio frequency signals with transmitters 30, 32, and with user devices via a Wi-Fi connection to a local wireless network and the internet. The communication circuitry 74 may be configured to communicate with remote controls and other remote devices using other approaches such as Bluetooth®, ZigBee, ultrasonic signals, infrared (IR) signals, or combinations thereof. A wired or wireless gateway may permit the movable barrier operator 12 to access an external network, such as the internet. The gateway may be a router, modem, access point, digital assistant, or a smart house hub, as some examples.

Regarding FIG. 1, the movable barrier operator system 10 may include a camera module 70. The camera module 70 may include a camera that is situated to capture security data such as still images/pictures, video, and/or audio within the garage 14. The camera module 70 may be configured to continuously capture security data. Alternatively, the camera module 70 may capture security data at certain times. For example, the camera module 70 may be configured to start capturing security data when the movable barrier operator system 10 opens the garage door 24 or shortly before the movable barrier operator 12 starts to open the garage door 24. The camera may continue to capture security data when the garage door 24 is open until the garage door 24 is closed or for a predetermined amount of time after the garage door 24 is closed. In further examples, the camera module 70 may be configured to capture security data based on sensed motion within the garage 14, or to start capturing security data in response to the movable barrier operator system 10 receiving an open command that includes information indicating an entity with limited access permission has requested opening of the garage door 24.

In some forms, the camera module 70 may further include a speaker and/or a microphone such that verbal communications may be exchanged between a person located in or near the garage 14 and a remote user.

Figure 2:
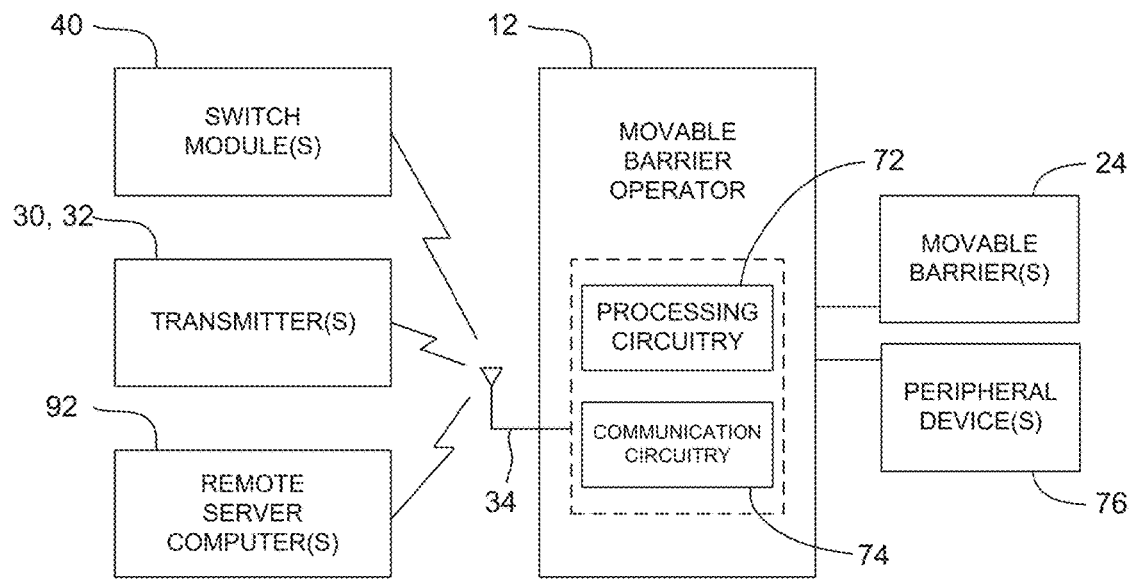
FIG. 2 is an example block diagram of a system for controlling operation of a movable barrier operator.

Regarding FIG. 2, the movable barrier operator 12 is configured to communicate with different external devices. For example, the communication circuitry 74 may include at least one antenna 34 configured to communicate with one or more switch modules 40, the transmitters 30, 32, and one or more remote server computers 92. The communications may utilize, for example, one or more of WiFi, Bluetooth®, ZigBee, infrared, cellular, WiMax, or LoRaWAN.

The communication circuitry 74 may also be capable of communicating via wired approaches, such as communications involving telephone systems, cable systems, power line transmission, or fiber optic lines. Additional forms of wired and wireless communication may also be utilized.

The processing circuitry 72 operates the movable barrier operator 12 in response to authorized state change requests being received at the communication circuitry 74. The processing circuitry 72 may also be configured to provide commands to control one or more peripheral devices 76. Such peripheral devices 76 may include object detectors (e.g., optical emitter 50 and/or optical detector 54), battery chargers, external lights, fans, air compressors, cameras, motion sensors, and alarm systems to name but a few examples. Additional peripheral devices common to households and garages may also be controlled by the movable barrier operator 12.

Figure 3:
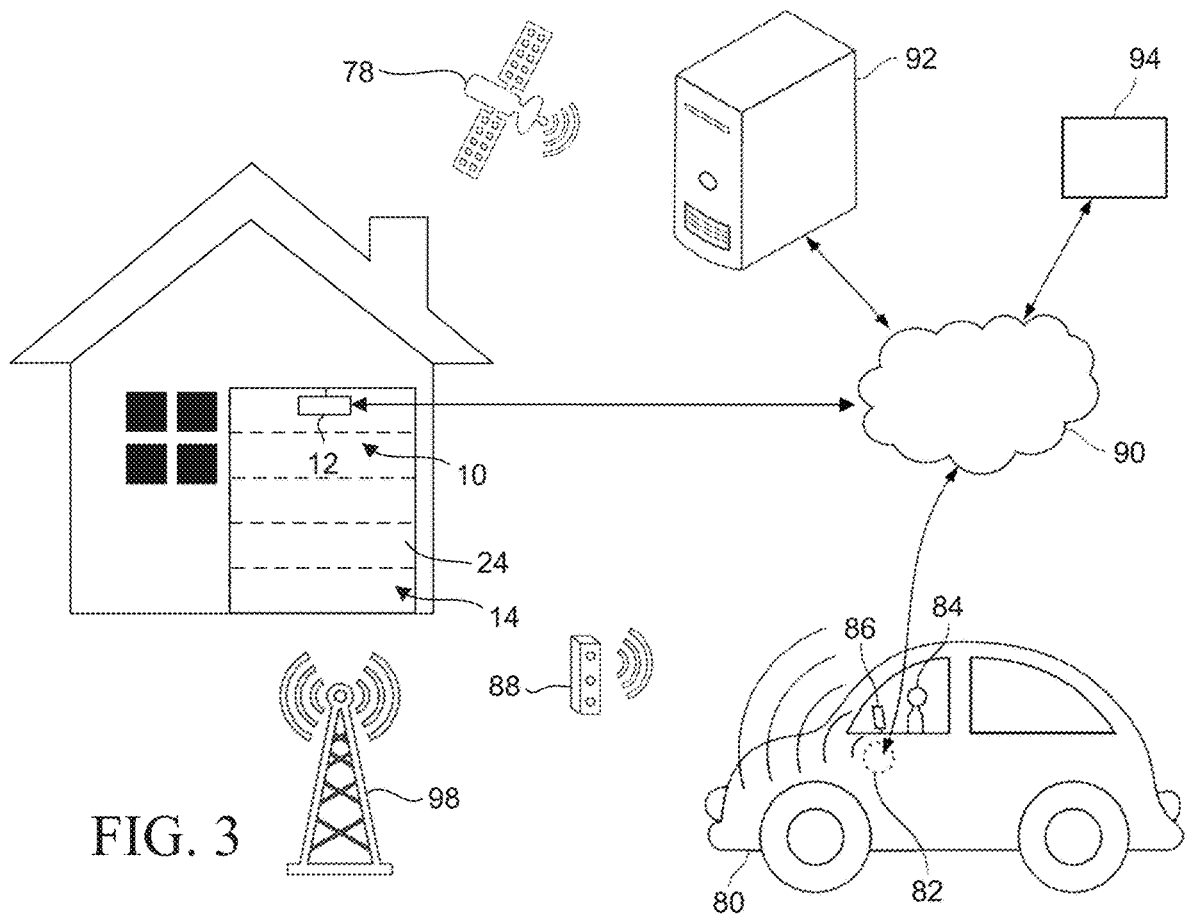
FIG. 3 is an example schematic representation of a system for automatically controlling operation of a movable barrier operator that includes an in-vehicle device.

Referring now to FIG. 3, a vehicle 80 includes an in-vehicle device 82, such as a human-machine interface of the vehicle 80. The in-vehicle device 82 may be configured to communicate directly with the movable barrier operator 12 via radio frequency signals or indirectly via a network 90 and a server computer, such as remote server computer 92, connected thereto. The network 90 may include one or more networks such as the internet and wide area networks. The direct and/or indirect communications between the in-vehicle device 82 and the movable barrier operator permit the in-vehicle device 82 to initiate a change of state (e.g., open or closed) of the garage door 24 when the vehicle 80 is near the garage 14, or distant from the garage 14 (e.g., via indirect communication over a wide area network).

A user 84 may also communicate with the movable barrier operator 12 via the network 90 and the remote server computer 92; for example, via a user device 86 (e.g., smartphone, smartwatch, tablet, or another portable device). Other devices, such as a computing device 94, may communicate with the network 90, as discussed in greater detail elsewhere herein. The computing device 94 may be, for example, a security system, a personal digital assistant, a desktop computer, a smartphone, smartwatch, or tablet computer.

Figure 4:
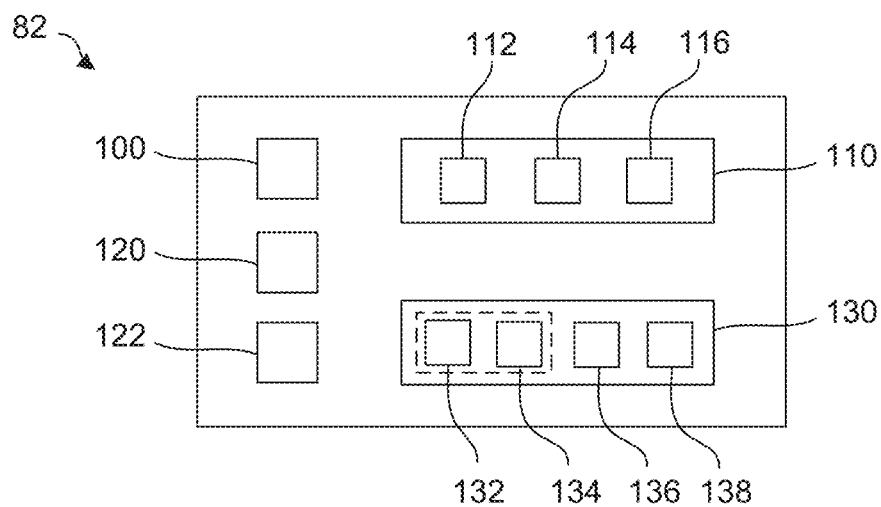
FIG. 4 is an example schematic representation of the in-vehicle device of FIG. 3.

Referring to FIG. 4, the in-vehicle device 82 may include a sensor 100 to detect a vehicle parameter of the vehicle 80. It is intended that "a" may refer to "at least one" such that references to "the sensor" encompass one, two, or more sensors. Similarly, references to "the vehicle parameter" encompass one, two, or more vehicle parameters.

In one example with reference to FIG. 3, the sensor 100 includes a global navigation satellite system (GNSS) receiver, such as a GPS receiver. The GNSS receiver receives location and/or timing data from one or more satellites 78, and the in-vehicle device 82 determines the location of the vehicle 80 based on the received data. Alternatively or additionally, the in-vehicle device 82 may determine the location of the vehicle 80 based on data from other sources, such as data from a nearby stoplight 88 or cellular tower 98. The sensor 100 may also include a sensor that detects a rotation of or otherwise communicates with a vehicle powertrain component that corresponds to the vehicle speed. The sensor 100 may also include an optical instrument, such as a standard optical camera or a thermographic camera, that may be configured to capture still or moving imagery within or outside of the vehicle.

The in-vehicle device 82 may further include communication circuitry 110 configured to communicate directly or indirectly with the movable barrier operator 12. For example, the communication circuitry 110 may include a radio frequency signal transmitter 112 (e.g., operable within the 300 MHz-900 MHz radio frequency band) configured to send a control command directly to the movable barrier operator 12 to cause a state change of the garage door 24. For example, the communication circuitry 110 may be configured to automatically initiate a state change of the garage door 24 based upon a parameter of the vehicle 80 such as the vehicle being within a predetermined proximity of the garage 14. The radio frequency signal transmitter 112 may be a universal transmitter configured to operate a plurality of different operator types. As one example, the radio frequency signal transmitter 112 may be a Homelink®-style transmitter.

The communication circuitry 110 may further include a wide area network interface 114 configured to communicate with the network 90 to send a state change request to the remote server computer 92. The state change request causes the remote server computer 92 to send a control command to the movable barrier operator 12 to cause the movable barrier operator 12 to change the state of the garage door 24 (e.g., close to open or vice versa). The wide area network interface 114 may communicate using, for example, cellular (3G, 4G, 4G LTE, 5G), WiMAX, LoRaWAN, and/or LTE-M. Additionally, the communication circuitry 110 may include a short-range wireless interface such as a short-range wireless transceiver 116 for communicating with the movable barrier operator 12 using one or more protocols including, for example, Bluetooth, Bluetooth Low Energy (BLE), Near Field Communication (NFC), WiFi, Z-wave, and ZigBee protocols.

The in-vehicle device 82 may further include a memory 120 and a processor 122. The memory 120 is configured to store information, such as information pertaining to one or more of a user (or users), the vehicle 80, and a secured area such as the garage 14. The processor 122 is configured to perform instructions stored in the memory 120, such as determining satisfaction of a user account condition.

The in-vehicle device 82 may further include a user interface 130. The user interface 130 may include a visual display 132, a user input interface 134, a microphone 136, and/or a speaker 138. In one approach, the visual display 132 and the user input interface 134 may be an integrated interface. An integrated interface may be, for example, in the form of a touch-sensitive display screen. For example, the touch-sensitive display screen may display a virtual button, a virtual keyboard, or a virtual keypad that allows a user to provide an input. In this manner, the same interface that conveys information to a user can also receive a user input. In still another approach, the user input interface is a dedicated user input interface. Such a dedicated user input 134 may include a single button, a keyboard, a keypad, or a touch-sensitive surface responsive to a user's touch. The microphone 136 may receive voice commands from a user in the vehicle. The speaker 138 may convey audible messages to the user.

The processor 122 may be operatively coupled to one or more of the sensor 100, the communication circuitry 110, the memory 120, and one or more components of the user interface 130 (e.g., visual display 132, user input interface 134, microphone 136, and speaker 138).

In another aspect, the in-vehicle device 82 is a user's smartphone or other portable electronic device such as a media player. The smartphone may communicate with the vehicle 80 to receive data, such as the location and speed of the vehicle 80. The smartphone may also be configured to retrieve the data itself. For example, the smartphone may receive location data from GPS satellites or cellular towers and determine the location of the vehicle 80 and determine whether the vehicle 80 has entered or exited a geofenced area. The smartphone may communicate a state change request to the movable barrier operator 12 via the remote server computer 92 or connect to the vehicle 80, such as via Bluetooth, and cause a radio frequency transmitter of the vehicle 80 to transmit a control command to the movable barrier operator 12.

The in-vehicle device 82 may be configured to communicate with the movable barrier operator 12 (either directly with radio frequency signals or indirectly via the remote server computer 92 and network 90) to cause the movable barrier operator 12 to control movement of the garage door 24. According to one aspect, operation of a movable barrier operator 12 may be automated. The term "automatic operation" of the movable barrier operator 12 is used herein to mean the user does not have to manually operate the in-vehicle device 82 to open or close the garage door 24. The in-vehicle device 82 may thereby autonomously, and without user intervention, operate the movable barrier operator 12 upon the in-vehicle device 82 determining satisfaction of one or more user account conditions. For example, the in-vehicle device 82 may be configured to communicate with the movable barrier operator 12 to cause the movable barrier operator 12 to open the garage door 24 as the vehicle 80 approaches the garage 14. The in-vehicle device 82 may also be configured to communicate with the movable barrier operator 12 to cause the movable barrier operator 12 to close the garage door 24, for example, as the vehicle 80 departs the garage 14. According to another aspect, operation may be partially- or semi-automated. For example, a user may be prompted (e.g., at the in-vehicle device 82) prior to the in-vehicle device 82 communicating a control signal to the movable barrier operator 12. The user may then confirm the user's desire (e.g., via an explicit response such as an acknowledgment (ACK) or negative acknowledgement (NACK), or by a passive response such as taking no action such that the prompt expires) to operate the movable barrier operator 12.

The in-vehicle device 82 may automatically trigger operation of the movable barrier operator 12 upon the sensor 100 of the in-vehicle device 82 detecting a vehicle parameter that indicates or relates to an automatic operation of the movable barrier operator 12. The vehicle parameter may be, for example, the location of the vehicle 80, and the in-vehicle device 82 may determine where the vehicle 80 is within a predetermined area associated with the movable barrier operator system 10. The vehicle parameter may include a parameter instead of or in addition to vehicle location, such as vehicle speed and/or orientation with respect to the garage 14. As such, communication between the in-vehicle device 82 and the movable barrier operator 12 may provide automatic operation of movable barrier operator 12 to control movement of the garage door 24.

Figure 5:
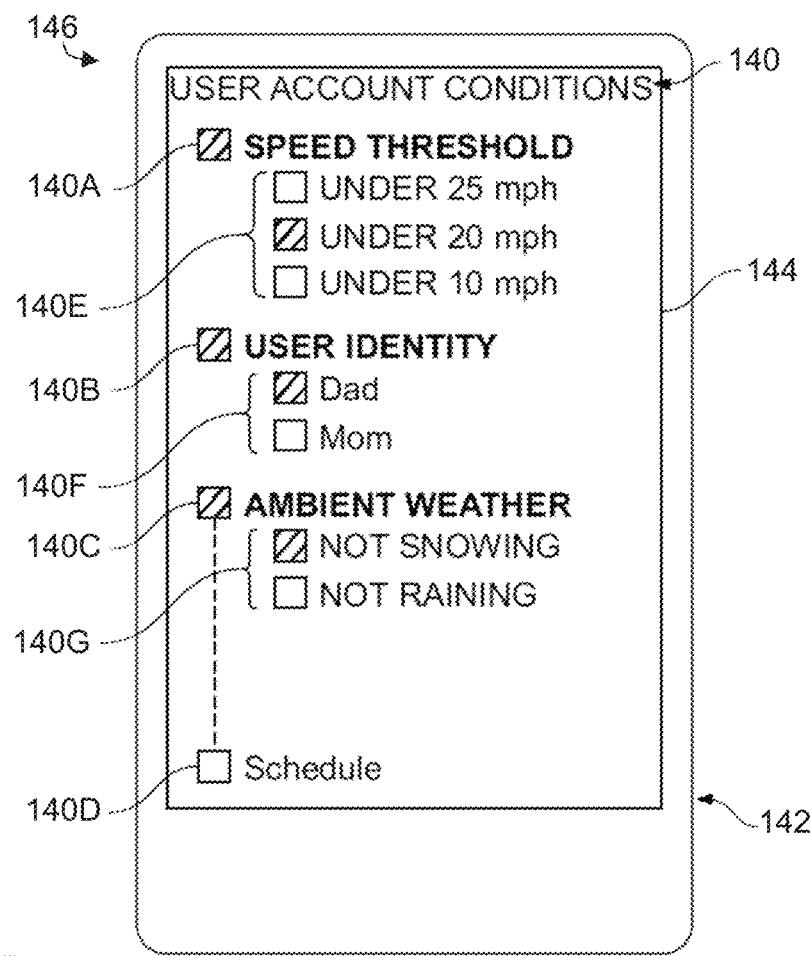
FIG. 5 is a view of an example screen of a user interface displaying user account conditions that limit automatic operation of the movable barrier operator of FIG. 1.

With reference to FIG. 5, the communications between the in-vehicle device 82 and the movable barrier operator 12 may include information related to one or more pre-determined user account conditions 140 set by a user that specify parameters for prompted or automatic operation of the movable barrier operator 12. The user account condition 140 is a condition that affects the user's interaction with the system 10. The user account condition 140 may be set with regard to parameters unrelated to the vehicle 80, such as weather, time of day, and who is (or is not) present in a building associated with the garage 14 or area secured by the movable barrier operator 12 and garage door 24. The user account condition 140 may be set at the in-vehicle device 82 or at the computing device 94. For example, if the vehicle 80 enters a geofenced area associated with the movable barrier operator 12 and the user account condition 140 is satisfied, then the in-vehicle device 82, the user device 86, remote server computer 92, and/or computing device 94 cause a control command to be automatically communicated to the movable barrier operator 12 to open the garage door 24. Conversely, if the vehicle 80 enters the geofenced area and the user account condition 140 is not satisfied, then a control command is not communicated to the movable barrier operator 12 despite the vehicle 80 entering the geofenced area. A user account condition 140 may operate as a check on whether or not the in-vehicle device 82 automatically operates the movable barrier operator 12 independent of whether the sensed vehicle parameter indicates automatic operation of the movable barrier operator 12. By utilizing user account conditions 140 to inform automatic operation of the movable barrier operator 12, the in-vehicle device 82 is less likely to operate the movable barrier operator 12 when undesired by the user.

An account user condition 140 may be entered at a user interface 142. The user interface 142 may be provided, for example, at one or both of the in-vehicle device 82 and at the computing device 94. The user interface 142 may include, for example, a touch screen 144, a microphone, speaker, and/or a keyboard. A user may enter account information such as credentials including a username and password at the user interface 142 to access a user account 146. Upon successful log in, the user interface 142 may display a graphical user interface for receiving user account conditions 140. For example, the user interface 142 may have a list with one or more user conditions 140 that the user may select. In this example, the user account conditions 140 refer to three parameters: vehicle speed threshold 140A, user identity 140B, and ambient weather 140C. The user may select (e.g., by touching the touch screen 144 of the user interface 142) which conditions 140 the user wants to have considered for automatic operation of the movable barrier operator 12. The user may also leave unchecked parameters (e.g. schedule parameter 140D) that may not be satisfied for automatic operation of the movable barrier operator 12. As shown in FIG. 5, the user has selected the vehicle speed threshold 140A as being a user account condition 140 that will be considered. The user has further selected that the speed threshold 140E of the vehicle 80 as it approaches the garage 14 be under 20 mph. The user has also selected the user identity 140B to be considered for automatic operation of the movable barrier operator 12. For example, the sensor 100 of the in-vehicle device 82 may include a sensor configured to detect the identity of the user device 86 (see FIG. 1) associated with a user in the vehicle 80, such as a smartphone, smart watch, key, or key fob. The processor 122 determines if the selected user identity 140F matches the in-vehicle identity detected by the sensor 100. Alternatively or additionally, the sensor 100 may be operable to detect a specific user/driver via weight, biometrics (e.g., facial, iris, fingerprint recognition) and/or seat adjustment, pedal height adjustment, steering wheel adjustment, or other vehicle-personalization selection or settings. The user has also indicated the ambient weather conditions outside of the garage 14 to be one of the user account conditions 140 considered for automatic operation of the movable barrier operator 12. The in-vehicle device 82 may receive ambient weather data via the communication circuitry 110, such as from a satellite or from the user device 86. The user has specified that it not be snowing 140G as a condition for automatically operating the movable barrier. Thus, the in-vehicle device 82 will not automatically operate the movable barrier operator 12 if snow is falling. The selected user account conditions 140A, 140B, 140C may be stored in the memory 120 of the in-vehicle device 82. Other examples of user account conditions 140 are described below.

In one application, as the vehicle 80 approaches the garage 14, the processor 122 uses GPS data from the sensor 100 to first determine whether the vehicle 80 is within a geofenced area associated with the garage 14. In one example, the location of the vehicle 80 is a vehicle parameter that must be satisfied before the one or more user account conditions 140 are checked. The processor 122 then determines whether the user account conditions 140A, 140B, 140C are satisfied. More specifically, if (1) the speed of the vehicle 80 is below 20 mph, (2) the user is "dad," and (3) it is not snowing outside, then the user account conditions 140A, 140B, 140C have been satisfied. The processor 122 will then cause the communication circuitry 110 to automatically transmit the control command from the radio frequency transmitter to the movable barrier operator 12 to open the garage door 24. In another example, if the user conditions 140A, 140B, 140C are satisfied, the processor 122 will cause the communication circuitry 110 to transmit the state change request to the remote server computer 92 via the network 90, and the remote server computer 92 will communicate a control command to the movable barrier operator 12.

Figure 6:
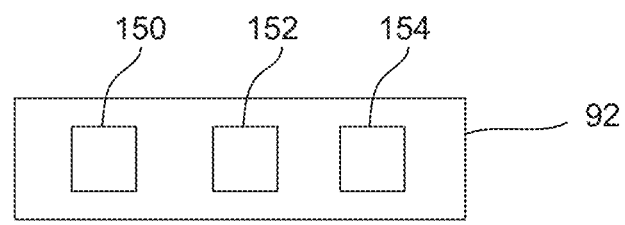
FIG. 6 is an example schematic representation of a remote server computer of the system of FIG. 1.

The remote server computer 92 may facilitate operation of the movable barrier operator 12. The remote server computer 92 may make decisions in conjunction with or in place of decision-making at the in-vehicle device 82, such as whether the vehicle parameter detected by the sensor 100 indicates automatic operation of the movable barrier operator 12 and whether the user account condition 140 has been satisfied. For example, and with reference to FIG. 6, the remote server computer 92 includes a network or communication interface 150 configured to communicate via the network 90 with the movable barrier operator 12 and cause the movable barrier operator 12 to move the garage door 24. The communication interface 150 is further configured to receive data from the in-vehicle device 82 via the network 90 regarding the vehicle parameter of the vehicle 80. Additionally, the communication interface 150 receives the user account condition 140 from the in-vehicle device 82, the computing device 94, or the user device 86. The remote server computer 92 also includes a memory 152 to store information such as user account conditions 140, as well as a processor 154 that is operatively coupled to the communication interface 150 and the memory 152. The processor 154 may determine whether the vehicle parameter of the vehicle 80 indicates automatic operation of the movable barrier operator 12, and whether the user account condition 140 is satisfied. If the vehicle parameter indicating automatic operation of the movable barrier operator 12 has been received and the user account condition 140 has been satisfied, then the remote server computer 92 will communicate a state change command to the movable barrier operator 12 via the network 90 to open the garage door 24. For example, the remote server computer 92 may send a message to the movable barrier operator 12. However, in one aspect, no state change command is sent if the vehicle parameter indicates automatic operation but fewer than all of the user account conditions have been satisfied.

Figure 7:
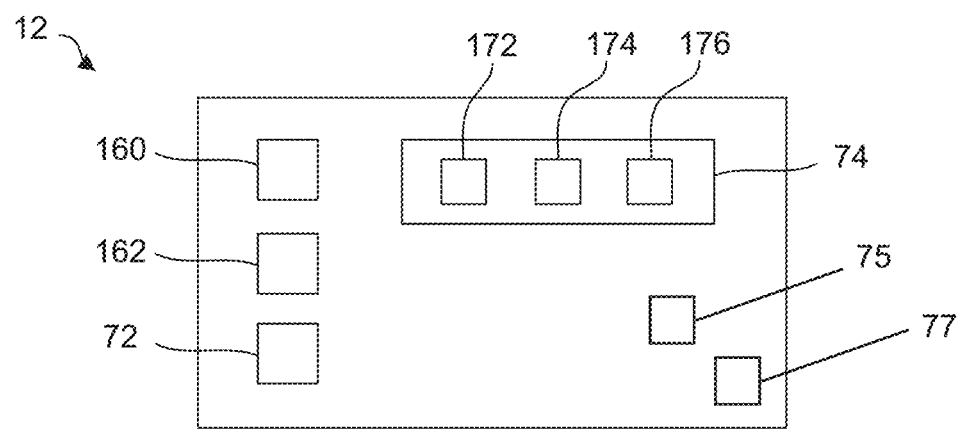
FIG. 7 is an example schematic representation of the movable barrier operator of the system of FIG. 1.

With reference to FIG. 7, the movable barrier operator 12 may have a motor 160 configured to be connected to a movable barrier, such as the garage door 24. The movable barrier operator 12 may also include a memory 162. The memory 162 may store identification and security (e.g. rolling code) information for authorized remote controls.

The movable barrier operator 12 may also include the communication circuitry 74. The communication circuitry 74 may be configured to receive the parameter of the vehicle 80 and the user account condition 140, for example, from the remote server computer 92 or directly from the in-vehicle device 82. The communication circuitry 74 includes a radio frequency signal receiver or transceiver 172 that may receive a command signal from the radio frequency signal transmitter 112 of the in-vehicle device 82 to change the state of the garage door 24.

The communication circuitry 74 may further include a long-range wireless transceiver 174. The long-range wireless transceiver 174 may be configured to communicate with the remote server computer 92 over the network 90. The transceiver 174 may receive a state change command from the remote server computer 92 (via the network 90) to cause the movable barrier operator 12 to change the state of the garage door 24. The transceiver 174 may also communicate information to other devices via the network 90, such as information identifying a user of the vehicle 80 to the computing device 94. The transceiver 174 may communicate with the network 90 via a wireless gateway or access point, such as a WiFi router. Additionally, the communication circuitry 74 may include a short-range wireless transceiver 176 for communication with the short-range wireless transceiver 116 of the in-vehicle device 82. For example, the short-range wireless transceiver 116 may be configured to receive the command signal from the in-vehicle device 82 over a short-range wireless protocol, such as Bluetooth.

The long-range wireless transceiver 174 and the short-range wireless transceiver 176 may both be configured to receive parameters of the vehicle 80 from a plurality of other devices. For example, the long-range wireless transceiver 174 and/or the short-range wireless transceiver 176 may be in communication with other local devices (e.g., home appliances, other vehicles, smartphones, etc.) to exchange and collect data that the in-vehicle device 82 provides. The long-range wireless transceiver 174 and the short-range wireless transceiver 176 may receive data from the other devices as part of a mesh network.

For example, the long-range wireless transceiver 174 of the movable barrier operator 12 may receive a signal from a LoRa-based sensor for wireless, long-range radio transmissions with low power consumption mounted to a stoplight, or from a V2X (vehicle to anything) component mounted to a stop sign at an intersection near the garage 14 upon the sensor detecting a beacon signal from the in-vehicle device 82. The movable barrier operator 12 would thereby be able to determine the vehicle 80 is nearby.

The movable barrier operator 12 also includes the processing circuitry 72 operatively coupled to the motor 160 and the communication circuitry 74. The movable barrier operator 12 may make decisions in conjunction with or in place of decision-making at the in-vehicle device 82 and/or the remote server computer 92. The decisions may include deciding whether the vehicle parameter identified by the sensor 100 indicates automatic operation of the movable barrier operator 12 and whether the user account condition 140 has been satisfied. For example, the processing circuitry 72 may be configured to cause the motor 160 to move the movable barrier 24 upon receiving the parameter of the vehicle 80 indicating automatic operation of the movable barrier operator 12 and the user account condition 140 being satisfied. Conversely, the processing circuitry 72 may be configured to not effect movement of the movable barrier 24 upon the received parameter of the vehicle 80 indicating automatic operation of the movable barrier operator 12 but fewer than all of the user account conditions being satisfied.

The movable barrier operator 12 may include a movable barrier position sensor 75 configured to detect the position of the garage door 24. The movable barrier position sensor 75 may include, for example, a tilt sensor mounted to the garage door 24 and configured to wirelessly transmit orientation data to the communication circuitry 74. In other embodiments, the movable barrier position sensor 75 may include a contact closure switch and/or a hall effect sensor on the tracks of the garage door 24 having a wired connection to the communication circuitry 74. As yet another example, the movable barrier position sensor 75 may include a sensor that detects rotation or translation of a component of a transmission of the movable barrier operator 12 as the motor 160 moves the garage door 24. An example of a sensor that detects movable barrier position includes a rotary encoder constituted by a light source directed toward a barrier operator transmission component and a detector that detects when the light is interrupted by the rotation of the component.

The movable barrier operator 12 may include an imminent motion notification apparatus 77 configured to output an alert upon reception of a remote closure command, message or signal and/or a remote open command, message or signal of the garage door 24. The imminent motion notification apparatus 77 may include, for example, a light that flashes or strobes, a speaker that emits a sound, or a combination thereof.

Figure 8:
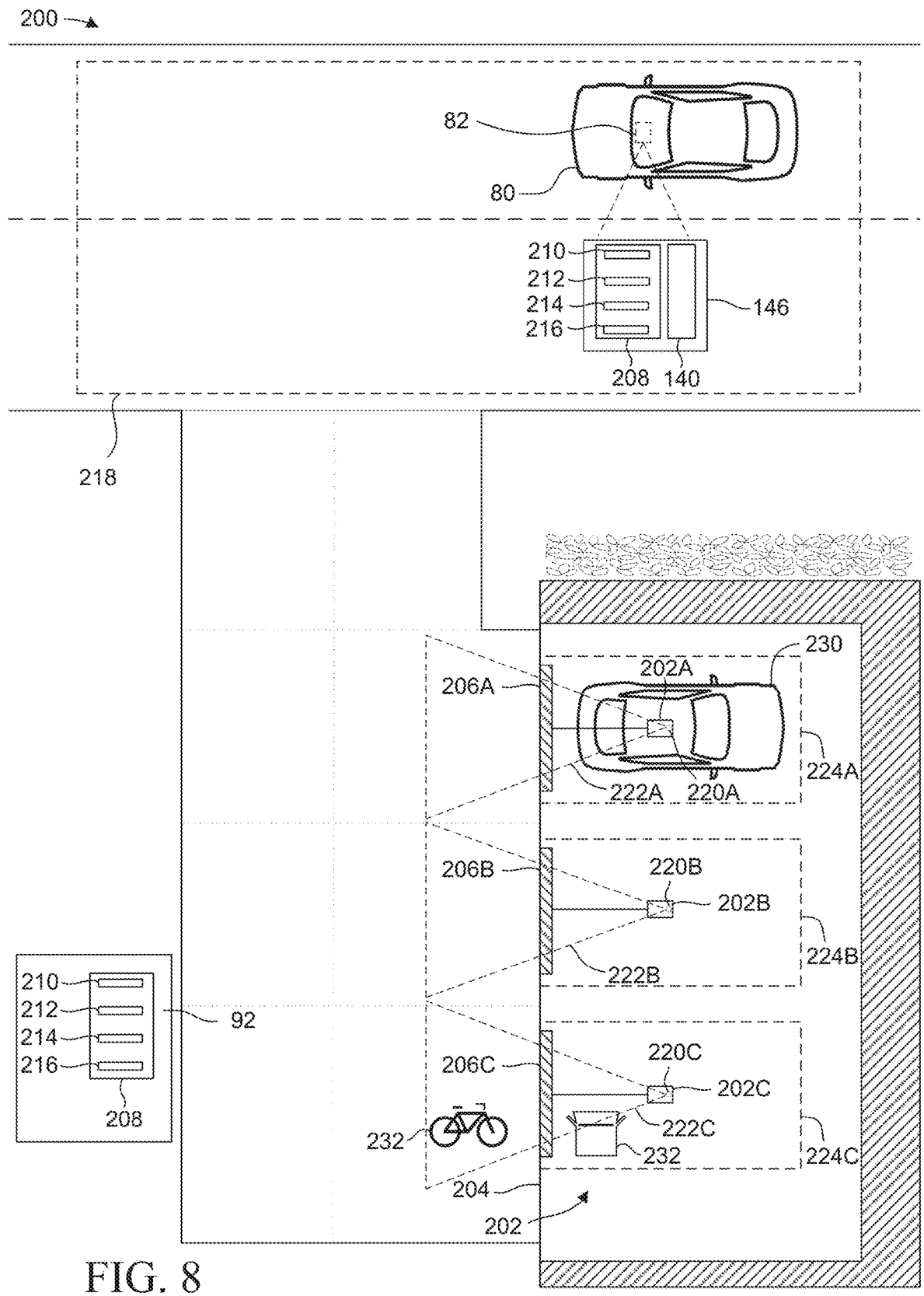
FIG. 8 is an example schematic representation of a movable barrier operator system for automatically selecting and controlling operation of a movable barrier operator selected from a plurality of movable barrier operators.

Referring now to FIG. 8, a garage 204 having a movable barrier operator system 200 is shown. The movable barrier operator system 200 may include multiple movable barrier operators 202A, 202B, and 202C, collectively referred to as movable barrier operators 202. One or more of the movable barrier operators 202 may generally correspond to the movable barrier operator 12 previously discussed. As such, the movable barrier operators 202 may be provided with the various components and/or operability of the movable barrier operator 12.

Each of the movable barrier operators 202 may be associated with a corresponding movable barrier 206A, 206B, and 206C, collectively referred to as movable barriers 206. The movable barriers 206 may generally correspond to the garage door 24, previously discussed. Although depicted as having three movable barrier operators 202A, 202B, 202C that are respectively associated with (e.g., mechanically connected to operate) movable barriers 206A, 206B, 206C, the movable barrier operator system 200 may be provided with one, two, or more movable barrier operators and one, two, or more movable barriers. Furthermore, although depicted as being provided in a single garage 204, individual movable barrier operators 202 may be provided in separate garages (e.g., separate structures). In some instances the system 200 may be used or adapted for a non-garage or non-residential context, for example, a commercial structure or building such as a warehouse, transportation/freight hub, fulfillment center, logistics center or the like that employs a plurality of the movable barrier operator(s) 202 and a plurality of the movable barrier(s) 206.

The movable barrier operator system 200 may be informed of a location of the vehicle 80. For example, the movable barrier operator system 200 may receive location data from the vehicle 80 (e.g., via the in-vehicle device 82 or user device 86), or from the remote server computer 92 via the network 90. In one aspect, the movable barrier operator system 200 may receive location data or projected location data from a navigation system of the vehicle 80. The navigation system of the vehicle 80 may be part of, or in communication with, an autonomous or "self-driving" vehicle control system of the vehicle 80.

The movable barrier operator system 200 may be configured to determine a location of the vehicle 80 and/or the in-vehicle device 82 according to a location-check routine. The location-check routine may be performed frequently to provide an accurate vehicle location for the movable barrier operator system 200. In one aspect, the location-check routine may be automatically performed (for example, according to a predetermined schedule). According to another aspect, the location-check routine may be initiated when a user interface of the in-vehicle device 82 is initiated or presented to a user that permits the user to select which movable barrier operator 202 to operate. According to another aspect, the location-check routine may be initiated on a random or periodic basis. In another example, the location-check routine may be initiated upon the vehicle traveling at a particular velocity or range of velocities. For example, the movable barrier operator system 200 may initiate a location-check routine approximately once every ten seconds while a vehicle 80 is traveling within a range of approximately 40 miles-per-hour and 60 miles-per-hour, and may initiate a location-check routine approximately once every second while the vehicle 80 is traveling less than 30 miles-per-hour. In another aspect, the movable barrier operator system 200 may initiate a location-check routine more frequently while the vehicle 80 is traveling at a relatively higher speed as compared to when the vehicle 80 is traveling at a relatively lower speed.

The movable barrier operator system 200 may be in communication with a navigation system (e.g., including sensor 100) of the vehicle 80 that provides the current location of the vehicle 80 to the system 200. The user may provide a destination to the navigation system, which the navigation system communicates to the system 200. The destination may include, for example, a street address and/or longitude and latitude of the destination. The destination may be a saved destination stored within the navigation system (e.g., "Home"), or may be manually input by the user for a given trip.

In one approach, the system 200 is configured to compare the destination to the location of the garage 204. Upon determining the garage 204 is the destination, the system 200 may be configured to automatically open a movable barrier 206 of the garage 204 in response to determining the vehicle 80 has entered the geofenced area 218. Conversely, upon determining the garage 204 is not the destination, the system 200 may not automatically open a movable barrier 206 of the garage 204 in response to determining the vehicle 80 has entered the geofenced area 218.

In one aspect, the movable barrier operator system 200 may be configured to predict a particular user-desired movable barrier operator for actuation among the multiple movable barrier operators 202 and automatically or semi-automatically operate the predicted movable barrier operator. For example, the movable barrier operator system 200 may be configured to select an individual movable barrier operator 202A, 202B, 202C at least in part as a function of the user's historical interactions with the movable barrier operator system 200. The movable barrier operator system 200 may be configured to select the individual movable barrier operator 202A, 202B, 202C in response to determining the vehicle 80 is within a predetermined proximity of the garage 204 (e.g., within a geofenced area 218), or in response to determining the vehicle 80 has entered or exited a geofenced area 218.

In one approach, the movable barrier operator system 200 may operate the movable barrier operators 202 based at least upon a behavior profile 208. The behavior profile 208 may be associated with a user account 146 of a user. The user account 146 may also include the user account conditions 140 previously discussed.

In one aspect, the behavior profile 208 is stored at a remote server (e.g., remote server computer 92 of FIG. 3) or multiple remote servers. Alternatively or additionally, the behavior profile 208 may be stored in the memory 120 of the in-vehicle device 82. Alternatively or additionally, the behavior profile 208 may be stored in a memory of one or more movable barrier operators 202.

The behavior profile 208 may be based at least in part upon prior user interactions with the movable barrier operator system 200. For example, each time a movable barrier operator 202 is operated in response to an interaction with a user, the behavior profile 208 for that user may be updated to include attributes associated with that operation. As such, the behavior profile 208 may be built using interaction data including a user parameter 210, a schedule parameter 212, and/or a vehicle parameter 214 for individual ones of user interactions with the movable barrier operator system 200. The user parameter 210 may include, or may be associated with, identifying parameters of a user that interacts with the system 200. The user parameter 210 may include a username associated with a user account; for example, as provided with the user account conditions 140 discussed elsewhere herein. The user parameter 210 may also include, for example, biometric information (fingerprint, retina, facial appearance, weight, seat position), identifying information for a key fob or key associated with the user, and/or identifying data of a device carried on the person such as a smartphone, a smart watch, or fitness tracker. The user parameter 210 may also include historical user selection information that identifies the signal frequency (e.g., 390 MHz) emitted by a remote control of a user to operate an individual movable barrier operator 202A, 202B, 202C from among the movable barrier operators 202. In this way, the user parameter 210 may inform the movable barrier operator system 200 of a user's preference for parking the vehicle 80 at a particular location within the garage 204.

The schedule parameter 212 may include, or be associated with, a temporal parameter of a user interaction with the system 200. In one example, the schedule parameter 212 may include, or may be based on, the date, time of day, day of the week, month, and/or year when one or more commands from the in-vehicle device 82 are communicated to operate a particular movable barrier operator (e.g., movable barrier operator 202A).

The vehicle parameter 214 may include, for example, the speed, direction, and/or location of the vehicle 80 as the user interacts with the system 200. The vehicle parameter 214 may also include proximity data indicative of whether the vehicle 80 is within a predetermined area associated with the movable barrier operator system 10.

Additionally or alternatively, the vehicle parameter 214 may include a vehicle heading or orientation with respect to the garage 204. As such, the vehicle parameter 214 may inform the movable barrier operator system 200 not to operate a movable barrier operator 202 despite the vehicle 80 being within a predetermined proximity of the movable barrier operator system 200 (e.g., within the geofenced area 218). For example, when the vehicle speed exceeds a predetermined threshold while the vehicle 80 is within the geofenced area 218, the movable barrier operator system 200 may not operate any of the movable barrier operators 202. In one example, this operability may be set by the user account condition 140A. Similarly, when the vehicle 80 is a heading in a direction away from the movable barrier operator system 200 while the vehicle 80 is within the geofenced area 218, the movable barrier operator system 200 may not operate a movable barrier operator 202.

Alternatively or additionally, the vehicle parameter 214 may include a vehicle identification information, which may correspond, for example, to a vehicle identification number (VIN), vehicle description, or license plate number.

The behavior profile 208 may be compiled over time as the user interacts with the movable barrier operator system 200. For example, the behavior profile 208 of a user may be updated with user interaction data including a user parameter 210, a schedule parameter 212, and a vehicle parameter 214 each time the vehicle 80 driven by the user enters the geofenced area 218 and the in-vehicle device 82 automatically causes the movable barrier operator 202A to operate. Similarly, the behavior profile 208 may be updated with user interaction data including a user parameter 210, a schedule parameter 212, and a vehicle parameter 214 each time the vehicle 80 enters the geofenced area 218, the in-vehicle device 82 prompts the user to select which movable barrier operator 202 to operate, and the user provides a user input to the in-vehicle device 82. Additionally or alternatively, the behavior profile 208 may be configured and/or updated to reflect one or more of user behavior trends and/or probabilities, machine learning, and at least one of positive training examples and negative training examples.

Figure 9:
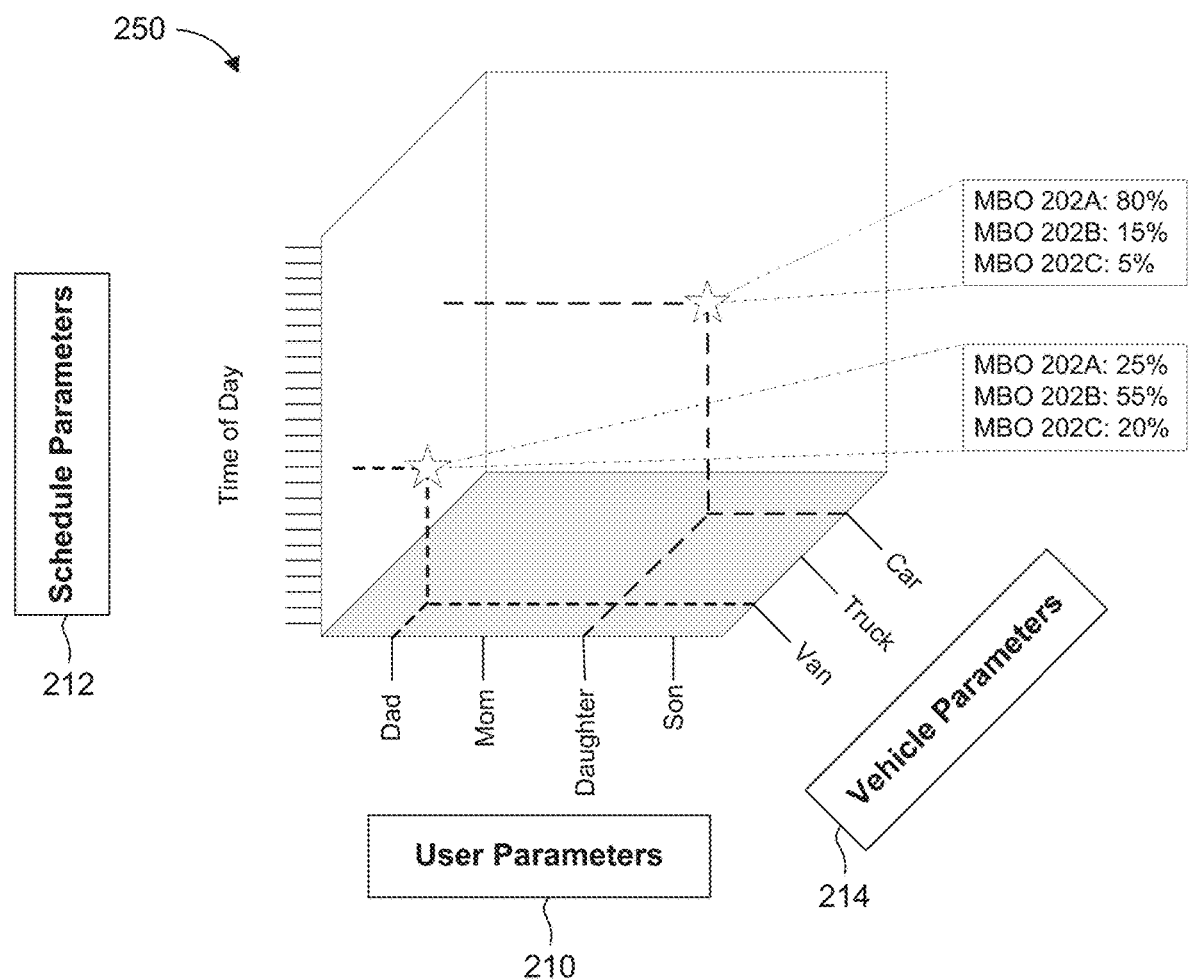
FIG. 9 is an example illustration of parameters used in a process for automatically selecting a movable barrier operator from a plurality of movable barrier operators.

Referring to FIG. 9, an illustration of parameters used in an example selection process 250 for selecting a movable barrier operator from a plurality of barrier operators based at least in part on the behavior profile 208 is provided. One or more operations of the selection process 250 may be performed, for example, at the in-vehicle device 82, the user device 86, the remote server computer 92, the computing device 94, and/or one or more of the movable barrier operators 202. For example, the in-vehicle device 82 and/or the remote server computer 92 may employ a respective instance of the behavior profile 208 that are continuously or periodically synced to contain similar data. In the example of FIG. 9, the remote server computer 92 may perform the selection process 250 using data from the in-vehicle device 82 and one of the movable barrier operators 202.

The selection process 250 may consider historical user interaction data, including user parameters 210, schedule parameters 212, and vehicle parameters 214. In this example, the user parameters 210 include data associated with four users including Dad, Mom, Daughter, Son, although any suitable number of users may be included. A user may be identified, for example, by a user-input (e.g., user selection or username input) provided to the in-vehicle device 82 or may be detected by a sensor (e.g., sensor 100 of FIG. 4).

The schedule parameters 212 may include temporal data associated with the different users' interactions with the system 200. The schedule parameters 212 may include, for example, the date and time each user caused operation of one of the movable barrier operators 202. The schedule parameter 212 may be, for example, the time of day as shown in FIG. 9.

The vehicle parameters 214 may include information identifying the vehicles the users are driving when the users interact with the system 200. For example, the vehicle parameter 214 may include a transmitter ID of a radio frequency control command transmitted from an in-vehicle device 82 of a vehicle. The server computer 92 may determine which vehicle operated a particular movable barrier operator 202 at a particular time of day based on the transmitter ID of a radio frequency control command received by the movable barrier operators 202. In this example, the vehicle parameters 214 include identifiers for three vehicles, car, truck, and van, although any suitable number of vehicles may be included.

With reference to FIGS. 8 and 9, the system 200 is configured to trigger a door open event when a vehicle 80 enters the geofenced area 218. In one example, the server computer 92 receives location information of a vehicle 80 indicating the vehicle 80 has entered the geofenced area 218. The server computer 92 determines the Daughter is driving the vehicle based on the presence of the Daughter's smartphone in the vehicle. The identity of the Daughter's smartphone is utilized as a user parameter 210. The server computer determines the time of day when the vehicle 80 entered the geofenced area. The time of day is utilized as a schedule parameter 212. The server computer 92 determines the identity of the vehicle the Daughter is driving by way of a transmitter ID that one of the movable barrier operators 202 detects from a radio frequency control command sent from the in-vehicle device 82 upon the vehicle 80 entering the geofenced area 218. The transmitter ID is utilized as a vehicle parameter 214.

The selection process 250 includes predicting which movable barrier operator 202 the Daughter wants to have actuated based at least on the behavior profile 208. In the example of FIG. 9, the server computer 92 selects movable barrier operator 202A to open in response to the radio frequency control command sent by the in-vehicle device 82. The server computer 92 selects movable barrier operator 202A because the Daughter has historically operated the movable barrier operator 202A eighty percent of the time when these user, schedule, and vehicle parameters 210, 212, 214 are present. That is, the selection process 250 determines that there is a high probability, likelihood, or confidence level that identified schedule, user, and vehicle parameters correspond to a user/driver desire to open a particular barrier. Additional fact-based data (such as in-vehicle sensing with a camera to identify the user) may also be considered in assessing a probability that a predicted action is the user-desired action.

The user may desire a different movable barrier operator 202 to operate than the movable barrier operator 202 selected by the server computer 92. In this situation, the user may operate the desired movable barrier operator 202 upon reaching the garage 204. The behavior profile 208 will update to reflect this alternative selection by the user. Over time, if the Daughter starts using movable barrier operator 202B more frequently than the movable barrier operator 202A in these situations (e.g., due to Daughter occasionally or persistently driving a different one of the vehicles), the behavior profile 208 will change to indicate that the selection process 250 should select movable barrier operator 202B when these user, schedule, and vehicle parameters 210, 212, 214 are present.

In another example of FIG. 9, the server computer 92 determines Dad is arriving at a particular time driving a van. The server computer 92 selects movable barrier operator 202B and causes movable barrier operator 202B to open the garage door 206B because, historically, Dad has operated movable barrier operator 202B fifty-five percent of the time in similar situations.

As such, the movable barrier operator system 200 may automatically predict a user-desired movable barrier operator from among a plurality of movable barrier operators 202. The prediction may be based on various variables (e.g., user parameters 210, schedule parameters 212, and vehicle parameters 214) described herein including but not limited to current/sensed data, historical data, and/or trends. The selection process 250 may be based on or more of the user parameters 210, schedule parameters 212, and vehicle parameters 214. In some approaches, only one or two types of parameters 210, 212, 214 may be used. In other approaches, the prediction or selection may be based on additional or alternative parameters, such as weather parameters.

In response to predicting the user-desired movable barrier operator from among a plurality of movable barrier operators, a method of operating the system 200 in one approach may include prompting the user for a confirmation that the predicted user-desired movable barrier operator is the actual user-desired movable barrier operator. In another approach, the method may include automatically actuating the predicted user-desired movable barrier operator without providing a prompt to the user. In either approach, the method may include providing a confirmation notification to the user of a movable barrier operation.

The movable barrier operator system 200 may include one or more cameras. One or more of the cameras may generally correspond to camera module 70 of FIG. 1. In one aspect, the movable barrier operator system 200 includes cameras 220A, 220B, 220C, collectively referred to as cameras 220, with each camera 220A, 220B, 220C having a respective field of view 222A, 222B, and 222C that covers at least a portion of the garage 204. Each field of view 222A, 222B, 222C may encompass at least a portion of a respective area 224A, 224B, 224C within the garage 204. The areas 224A, 224B, 224C may be, for example, parking spaces within the garage 204. Each field of view 222A, 222B, 222C may also extend outside of the garage 204 when the respective movable barrier 206A, 206B, 206C is open. In another aspect, the movable barrier operator system 200 may include fewer cameras than movable barrier operators; for example, one camera for observing areas associated with multiple movable barriers. The movable barrier operator system 200 may also include one or more cameras disposed on and/or within a vehicle to capture imagery outside of and/or within the vehicle.

In certain instances, the movable barrier operator system 200 may be configured to automatically operate a particular movable barrier operator 202 that is not the movable barrier operator predicted by the movable barrier operator system 200 according to the behavior profile 208. Such a "next-best" operation may occur, for example, when a camera determines an object is in or blocking an area associated with the selected movable barrier operator. For example, the camera 220A may detect that another vehicle 230 is already parked in the area 224A associated with the movable barrier operator 202A which the remote server computer 92 predicts the user will want to operate. As another example, the remote server computer 92 may predict the user will want to operate movable barrier operator 202C but the camera 220C detects an object 232, such as a package or bicycle, blocking the area 224C. In response to the unexpected object 232, the remote server computer 92 decides to cause movable barrier operator 202B to open the movable barrier 206B. The remote server computer 92 may cause the in-vehicle device 82 to provide a notification to the user that the user should park in the area 224B rather than area 224C due to the object 232. Alternatively, the in-vehicle device 82 may cooperate with one or more vehicle systems or components to facilitate autonomous or semi-autonomous parking of the vehicle in the vacant/available area 224B once the movable barrier 206B is opened by associated movable barrier operator 202B.

In this regard, a method of operating a movable barrier operator system 200 may include, responsive to receiving a barrier operator state change request, determining a first movable barrier operator associated with one or more parameters of a behavior profile 208. The first movable barrier operator may be determined from among a plurality of movable barrier operators. The method may further include observing, via at least one camera, a first garage area associated with the first movable barrier operator. The method may further include, responsive to determining an obstruction located within the first garage area, determining a second movable barrier operator. In one approach, the second movable barrier operator may be associated with one or more parameters of the behavior profile 208. Alternatively, the second movable barrier operator may be located adjacent (e.g., "next closest") to the first movable barrier operator. In an optional approach, the method may further include observing, via at least one camera, a second garage area associated with the second movable barrier operator. The camera may be the same camera as, or different camera than, the camera that observed the first garage area. In response to determining an obstruction located within the second garage area, the method may proceed to evaluate a third location associated with a third movable barrier operator, and so on until a suitable location is determined.

If the movable barrier operator system 200 determines that no obstruction is located within the second garage area (or other subsequently-observed garage location), the method may include operating the second movable barrier operator to move the associated movable barrier. In an optional approach, the method may include transmitting a notification to the user regarding which movable barrier operator has been actuated. The method may still further include an indication of why that movable barrier operator was actuated. For example, the method may include transmitting an image captured by a camera indicating a vehicle or object obstructing the location of the first movable barrier operator.

In addition to the cameras 220, or as an alternative to the cameras 220, the movable barrier operator system 200 may communicate with one or more peripheral devices to determine whether any obstructions are located within a garage area associated with a predicted movable barrier operator. The one or more peripheral devices may include optical systems (optical emitter 50 and/or optical detector 54 of FIG. 1), loop detectors, motion sensors, and alarm systems to name but a few examples.

Upon determining that a geolocation condition has been satisfied (e.g., vehicle 80 has entered the geofenced area 218) and that door open event is appropriate (e.g., no obstructions detected in an area 224 associated with a movable barrier operator 202), the movable barrier operator system 200 triggers a door open event. In one aspect, the system 200 monitors various attributes associated with the triggered door open event. For example, the system 200 may monitor attributes pertaining to the vehicle 80 and/or movable barrier operator(s) 202 associated with the trigger event. Vehicle attributes may include one or more of a vehicle speed, vehicle location, vehicle heading, and steering wheel position. Movable barrier operator attributes may include a door position (e.g., open or closed), a door operating state (e.g., opening or closing), and/or a state of one or more peripheral devices (e.g., optical emitter 50 and/or optical detector 54 of FIG. 1).

In one approach, upon triggering the door open event, the system 200 monitors for an auto-close event. As used herein, an auto-close event refers to automatic operation of a movable barrier operator 202 to close a movable barrier 206 in the absence of a close command from a user. An auto-close event may occur, for example, when the system 200 detects vehicle behavior that is not associated with a vehicle parking in a garage. For example, if the system 200 opens a movable barrier 206 upon a vehicle entering the geofenced area 218 and subsequently detects a vehicle speed exceeding a threshold vehicle speed for a given location (e.g., a predetermined proximity to a garage 204), the system 200 triggers an auto-close event to thereby close the movable barrier 206 previously opened by the system 200.

Additionally or alternatively, an auto-close event may occur when the system 200 does not detect vehicle behavior that is associated with a vehicle parking in a garage. For example, the system 200 may monitor one or more peripheral devices to confirm a vehicle 80 has entered the garage 204. The peripheral devices may include optical systems (e.g., the camera of camera module 70, optical emitter 50 and/or optical detector 54 of FIG. 1), loop detectors, and motion sensors to name but a few examples. The system 200 may monitor the one or more peripheral devices for a predetermined time period relative to the initiation of the door open event. For example, the system 200 may monitor a peripheral device for two minutes, five minutes, or ten or more minutes after initiating the door open event. If the peripheral device does not detect a vehicle (e.g., the photo beam between the optical emitter 50 and the optical detector 54 is not interrupted) within the predetermined period of time, the system 200 triggers an auto-close event to thereby close the movable barrier 206 previously opened in response to the door open event.

In one approach, the monitored vehicle behavior may be compared to a parking routine profile 216 associated with a user profile. The parking routine profile 216 associated with a user profile may be compiled over time, and may be saved within one or more memory devices of the system 200 (e.g., memory 120 of the in-vehicle device 82, memory 152 of the remote server computer 92, and/or memory 162 of the movable barrier operator 12). The vehicle behavior may be monitored, for example, using the camera module 70.

Different users may have different parking routine profiles 216 based on respective driving routines. A driving routine may include vehicle driving attributes (e.g., vehicle location, vehicle speed, vehicle acceleration and/or deceleration, vehicle heading), days of the week and/or times associated with one or more of the vehicle attributes, and/or system conditions associated with a garage.

In one example, the system 200 compiles a parking routine profile 216 for Dad that is based on Dad's driving routine. For example, Dad's parking routine profile 216 may indicate that the vehicle 80 operated by Dad typically enters the geofenced area 218 while traveling at approximately 45 miles per hour (MPH) The vehicle 80 subsequently slows to approximately 15 MPH and makes a right-hand turn, and further slows to approximately 5 MPH and makes a left-hand turn to arrive home between 4:10 PM and 6:20 PM on weekdays. The parking routine profile 216 may further indicate that upon door opening, Dad's vehicle interrupts the photo beam between the optical emitter 50 and the optical detector 54.

The system 200 may be configured to initiate an auto-close event in response to the monitored parking routine deviating from a user's parking routine profile 216. The deviation that triggers an auto-close event may include, for example, a change in a vehicle parameter during an operation outside of a tolerance for the operation, such as a vehicle speed more than five MPH above an expected speed. Another example of a deviation that triggers an auto-close event may include an omission of an expected operation, such as the vehicle not turning at an intersection where the system 200 expects the vehicle to turn. The system 200 may also monitor the time of day and day of the week to compare against the user's parking routine profile 216. A deviation from the user's parking routine profile 216 may include the vehicle initiating a door open event outside of the day(s) of the week and/or times of day expected by the user's parking routine profile 216. Based on one or more deviations from the user's parking routine profile 216, the system 200 may assume the user does not intend to park the vehicle in the garage.

For example, upon the system 200 (e.g., at the server computer 92) determining Dad is driving the vehicle 80 (e.g., based on the presence of Dad's smartphone in the vehicle 80) that has entered the geofenced area 218, the system 200 operates a movable barrier operator to open a predicted movable barrier. The system 200 then monitors for behavior associated with Dad's parking routine profile 216 to determine if Dad is parking (or will be parking) in the predicted garage. Using the previous example of Dad's parking routine profile 216, if upon slowing to approximately 5 MPH, Dad's vehicle 80 does not subsequently make a left-hand turn, the system 200 may initiate an auto-close event. Or, if Dad did make the left-hand turn, but did not interrupt the photo beam between the optical emitter 50 and the optical detector 54 (e.g., within a predetermined time period), the system 200 may initiate an auto-close event.

In this way, the system 200 determines the vehicle 80 has not parked, or is not going to park, in the garage 204 associated with a predicted movable barrier 206. As such, the system 200 closes the movable barrier 206 to limit access to the garage 204.

Figure 10:
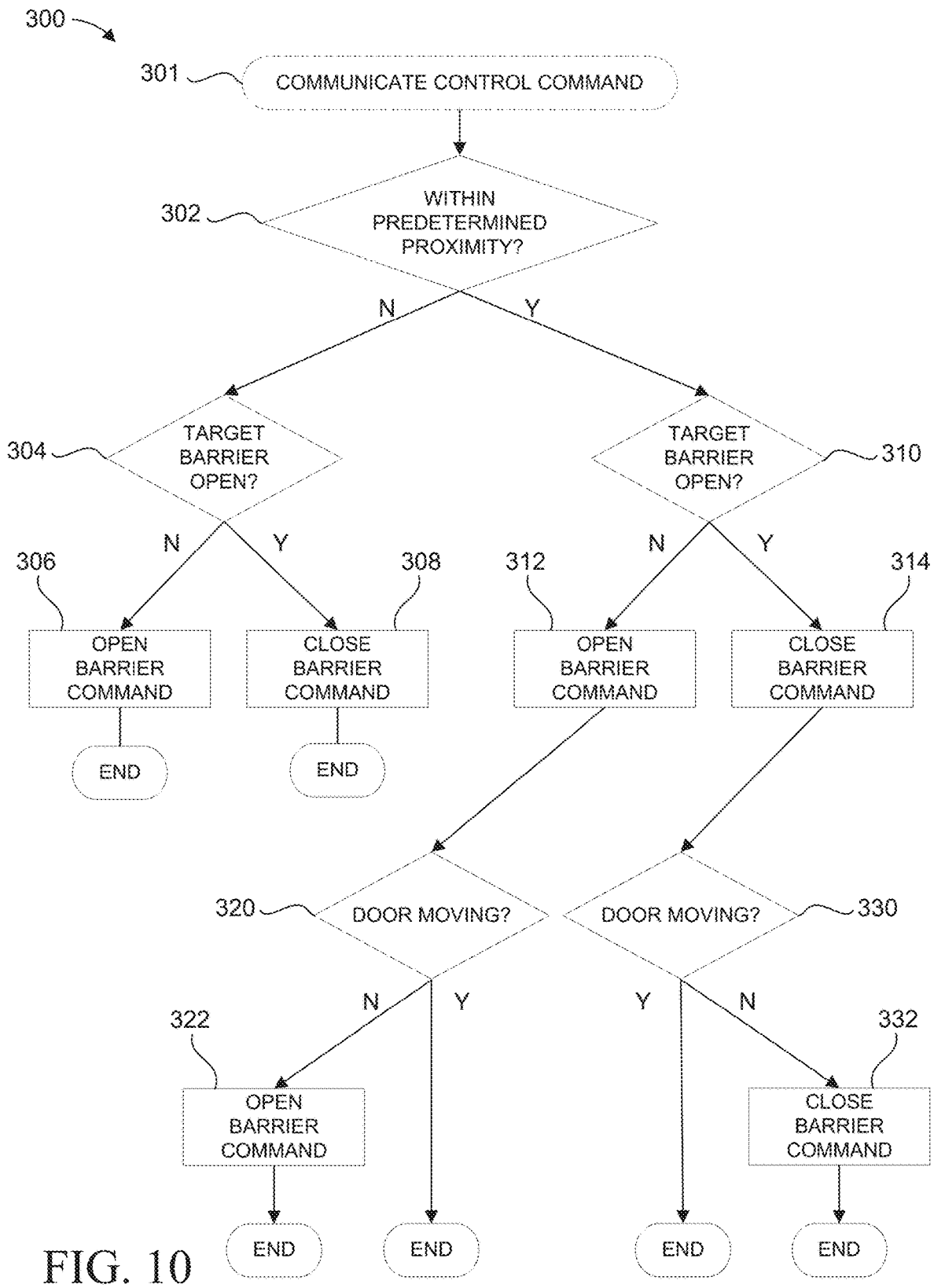
FIG. 10 is an example flow diagram of a method of remotely controlling operation of a movable barrier operator.

Referring to FIG. 10, a method 300 is provided for operating a movable barrier operator that may be utilized with the system 200 discussed above. In one approach, the method may include an optional operation of communicating 301 a control command. The control command may be communicated, for example, from a transportable device (e.g., the transmitter 30 or the in-vehicle device 82). As discussed elsewhere herein, the communication of the control command may be user-initiated, or may be automatically or semi-automatically initiated by the in-vehicle device 82, for example, based on a location of the vehicle 80.

The control command may direct the movable barrier operator to toggle or change a state of the movable barrier (e.g., from "open" to "closed" or vice versa). The control command may instead be a state-specific command (e.g., "open" or "close"). In the latter approach, the method may include determining a position of the movable barrier. If, for example, movable barrier operator receives an "open" command while the movable barrier is in the open position, the method may end. Similarly, if movable barrier operator receives a "close" command while the movable barrier is in the closed position, the method may end.

The method 300 may include determining 302 satisfaction of a predetermined relative proximity of the transportable device relative to a secured area. For example, the determining 302 may include determining whether the in-vehicle device 82 is within a set distance of the garage 204 or geofenced area.

If, at step 302, the relative proximity determination is not satisfied, the method 300 may further include determining 304 a condition (e.g., an open or closed position) of a target barrier. As used herein, a target barrier may refer to a user-selected barrier, or may refer to a predicted barrier (e.g., as predicted by movable barrier operator system 200).

If, at step 304, the target barrier is in a closed position, the method may include transmitting 306 (e.g., via the in-vehicle device 82) a control command to open the movable barrier. If, at step 304, the target barrier is in an open position, the method may include transmitting 308 (e.g., via the in-vehicle device 82) a command to close the movable barrier. Because the vehicle is not within a set distance of the garage 204, one or both of the open and the close commands of steps 306 and 308 may be transmitted, for example, via a wide area transmission (e.g., wide area network interface 114 configured to communicate with the remote server computer 92 via the network 90).

If, at step 302, the relative proximity determination is satisfied, the method may further include determining 310 a condition (e.g., an open or closed position) of the target barrier. If, at step 310, the target barrier is in a closed position, the method may include transmitting 312 (e.g., via the in-vehicle device 82) a control command to open the movable barrier. If, at step 310, the target barrier is in an open position, the method may include transmitting 314 (e.g., via the in-vehicle device 82) a command to close the movable barrier. One or both of the open and the close commands of steps 312 and 314 may be transmitted, for example, via a RF transmission (e.g., via radio frequency signal transmitter 112), or via other short-range transmissions (e.g., via short-range wireless transceiver 116).

As discussed, the control command may be a state-change command that directs the movable barrier operator to change a state of the movable barrier (e.g., from "open" to "closed" or vice versa). In one aspect, the method may include determining a heading of the vehicle to predict a desired movable barrier position. In this way, when the vehicle 80 is traveling in a direction of the movable barrier and the movable barrier is already in an open position, the movable barrier operator may not operate the movable barrier upon receiving a state-change command.

In one approach, the method 300 may further include, after transmitting 312 the control command to open or close the target movable barrier, determining 320 a door moving state. The determination may be made, for example, after a predetermined period of time. The predetermined period of time may be, for example, approximately, one second, two seconds, or three or more seconds. In response to determining the door moving state is not moving, the method 300 may further include, transmitting 322 a repeat open command to the movable barrier. The repeat open command may be transmitted, for example, via a wide area transmission (e.g., wide area network interface 114 configured to communicate with the remote server computer 92 via the network 90).

In one approach, the method 300 may further include, after transmitting 314 the command to close the movable barrier, determining 330 a door moving state. The determination may be made, for example, after a predetermined period of time. The predetermined period of time may be, for example, approximately, one second, two seconds, or three or more seconds. In response to determining the door moving state is not moving, the method may further include, transmitting 332 a repeat close command to the movable barrier. The repeat close command may be transmitted, for example, via a wide area transmission (e.g., wide area network interface 114 configured to communicate with the remote server computer 92 via the network 90).

In one approach, an auto-close method may be performed by the in-vehicle device 82 described with respect to FIG. 3. The sensor 100 of the in-vehicle device 82 may be configured to detect a vehicle characteristic indicative of the vehicle 80 being in proximity to an area associated with the movable barrier operator, such as entering a geofenced area near the garage 204. Vehicle characteristics may include at least one of the location of the vehicle 80, a distance between the vehicle 80 and a location (such as a garage) associated with the movable barrier operator 202, the speed of the vehicle 80, the heading of the vehicle 80, and a programmed vehicle destination of the vehicle 80.

Communication circuitry 110 of the in-vehicle device 82 may be configured to communicate directly or indirectly with a movable barrier operator 202. For example, the communication circuitry 110 may communicate an open command to a movable barrier operator 202 that causes the movable barrier operator 202 to open a movable barrier 206 connected to the movable barrier operator 202. The communication circuitry 110 may also be configured to receive data indicative of a position of the movable barrier 206 from a server computer, such as the server computer 92 of FIGS. 2 and 6.

The processor 122 is operatively coupled to the sensor 100, communication circuitry 110, and a memory 120 of the in-vehicle device 82. The memory 120 of the in-vehicle device 82 is configured to store one or more vehicle arrival conditions that are indicative of whether the vehicle 80 arrived at the location associated with the movable barrier operator 202. The processor 122 of the in-vehicle device 82, the processor 154 of the server computer 92, and/or the processor circuitry 72 of the movable barrier operator may be configured to determine satisfaction of the one or more vehicle arrival conditions. The vehicle arrival conditions may include, for example, whether the vehicle 80 arrived at the location associated with the movable barrier operator 202, whether the vehicle movement corresponds to the vehicle parking routine, whether the vehicle destination corresponds to the location associated with the movable barrier operator 202, whether a distance of the vehicle 80 from the location associated with the movable barrier operator 202 corresponds to an expected distance, whether a speed of the vehicle 80 corresponds to an expected speed, and/or whether a heading of the vehicle 80 corresponds to an expected heading.

Upon the vehicle arrival condition not being satisfied, the processor 122 is configured to cause the communication circuitry 110 to communicate a close command to the movable barrier operator 202 that causes the movable barrier operator 202 to close the movable barrier 206. The vehicle arrival condition not being satisfied may indicate that the user has decided to drive past her home and does not desire to enter the garage 14. For example, communication circuitry 110 may communicate the close command directly to the movable barrier operator using a radio frequency signal. In another embodiment, the processor 122 causes the communication circuitry 110 to communicate the close command indirectly to the movable barrier operator via the network 90 and the server computer 92. In still another embodiment, the processor 154 of the server computer 92 determines whether the vehicle arrival condition is satisfied and, if not, communicates a close command to the movable barrier operator.

In one approach, the memory 120 of the in-vehicle device 82 is further configured to store a time period within which a vehicle arrival condition is expected to occur. The processor 122 may cause the communication circuitry 110 to communicate the close command upon the vehicle arrival condition not being satisfied within the time period. The time period may be, for example, measured from the time the communication circuitry 110 communicates the close command to the movable barrier operator. As an example, the time period may be two, three, or four minutes. The time period may be fixed or variable. In one embodiment, the time period varies depending on the speed of the vehicle so that the time period is shorter when the vehicle is traveling at a higher speed toward the garage, and the time period is longer when the vehicle is traveling at a slower speed toward the garage.

The sensor 100 may include a global navigation satellite system receiver, and the processor 122 may to determine location information of the vehicle 80 based on information from the sensor 100. For example, the processor 122 may receive data from the sensor 100 regarding movement of the vehicle 80 upon the vehicle 80 being in proximity to the location associated with the movable barrier operator 202.

Although method steps may be presented and described herein in a sequential fashion, one or more of the steps shown and described may be omitted, repeated, performed concurrently, and/or performed in a different order than the order shown in the figures and/or described herein. It will be appreciated that computer-readable instructions for facilitating the methods described above may be stored in various non-transitory computer readable mediums as is known in the art.

Uses of singular terms such as "a," "an," are intended to cover both the singular and the plural, unless otherwise indicated herein or clearly contradicted by context. The terms "comprising," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. An in-vehicle device for facilitating operation of a movable barrier operator, the in-vehicle device comprising:
  a sensor configured to detect a vehicle characteristic indicative of a vehicle being in proximity to a location associated with the movable barrier operator;
  communication circuitry to communicate an open command to the movable barrier operator that causes the movable barrier operator to open a movable barrier connected to the movable barrier operator;
  a memory configured to store a vehicle arrival condition indicative of whether the vehicle arrives at the location associated with the movable barrier operator; and
  a processor operatively coupled to the sensor, the communication circuitry, and the memory, the processor configured to trigger an auto-close event upon determining that the vehicle arrival condition is not satisfied after communication of the open command,
  wherein the auto-close event includes the processor directing the communication circuitry to communicate a close command to the movable barrier operator that causes the movable barrier operator to close the movable barrier.

2. The in-vehicle device of claim 1 wherein the memory is configured to store a time period and, wherein the processor is further configured to determine that the vehicle arrival condition is not satisfied when the vehicle arrival condition fails to be satisfied within the time period as measured from the communication of the open command.

3. The in-vehicle device of claim 1 wherein the communication circuitry is configured to communicate the open command directly to the movable barrier operator using a radio frequency signal; and
wherein the processor is configured to cause the communication circuitry to communicate the close command to the movable barrier operator via a network and a server computer.

4. The in-vehicle device of claim 1 wherein the communication circuitry is configured to receive data indicative of a position of the movable barrier from a server computer; and
wherein the processor is configured to cause the communication circuitry to communicate the close command to the movable barrier operator upon the vehicle arrival condition not being satisfied and the data received from the server computer indicating the position of the movable barrier is an open position.

5. The in-vehicle device of claim 1 wherein the memory is configured to store a movable barrier position; and
wherein the processor is configured to cause the communication circuitry to refrain from communicating the open command upon the movable barrier position stored in the memory indicating that the movable barrier is open.

6. The in-vehicle device of claim 1 wherein the memory is configured to store geofence data representative of a geofenced area;
wherein the processor is configured to utilize data from the sensor to determine a location of the vehicle; and
wherein the processor is configured to determine that the vehicle is in proximity to the location associated with the movable barrier operator in response to the vehicle entering the geofenced area.

7. The in-vehicle device of claim 1 wherein the sensor includes a global navigation satellite system receiver;
wherein the processor is configured to determine whether the vehicle arrives at the location associated with the movable barrier operator using data from the global navigation satellite system receiver; and
wherein the vehicle arrival condition includes whether the vehicle arrives at the location associated with the movable barrier operator.

8. The in-vehicle device of claim 1 wherein the memory is configured to store a vehicle parking routine;
wherein the processor is configured to receive data from the sensor regarding movement of the vehicle upon the vehicle being in proximity to the location associated with the movable barrier operator; and
wherein the vehicle arrival condition includes whether the movement of the vehicle corresponds to the vehicle parking routine.

9. The in-vehicle device of claim 1 further comprising a user interface configured to receive a user input indicative of a vehicle destination; and
wherein the vehicle arrival condition includes whether the vehicle destination corresponds to the location associated with the movable barrier operator.

10. The in-vehicle device of claim 1 wherein the vehicle arrival condition includes at least one of:
whether a distance of the vehicle from the location corresponds to an expected distance;
whether a speed of the vehicle corresponds to an expected speed; and
whether a heading of the vehicle corresponds to an expected heading.

11. A method of operating an in-vehicle device, the method comprising:
detecting a vehicle characteristic indicative of a vehicle being in proximity to a location associated with a movable barrier operator;
communicating, via communication circuitry of the in-vehicle device, an open command to the movable barrier operator that causes the movable barrier operator to open a movable barrier connected to the movable barrier operator;
determining, via a processor of the in-vehicle device, satisfaction of a vehicle arrival condition indicative of whether the vehicle arrived at the location associated with the movable barrier operator; and
triggering an auto-close event upon the processor determining that the vehicle arrival condition is not satisfied after communication of the open command, wherein the auto-close event includes the communication circuitry communicating a close command to the movable barrier operator that causes the movable barrier operator to close the movable barrier.

12. The method of claim 11 further comprising:
monitoring a time period associated with communication of the open command to the movable barrier operator; and
triggering the auto-close event when the vehicle arrival condition fails to be satisfied within the time period.

13. The method of claim 11 wherein communicating the open command to the movable barrier operator via the communication circuitry of the in-vehicle device includes the communication circuitry communicating the open command directly to the movable barrier operator using a radio frequency signal; and
wherein the communication circuitry communicating the close command to the movable barrier operator includes communicating the close command to the movable barrier operator via a network and a server computer.

14. The method of claim 11 further comprising receiving, via the communication circuitry, data indicative of a position of the movable barrier from a server computer; and
wherein the communication circuitry communicating the close command to the movable barrier operator includes the communication circuitry communicating the close command upon the vehicle arrival condition not being satisfied and the data received from the server computer indicating the position of the movable barrier is an open position.

15. The method of claim 11 further comprising storing, at a memory of the in-vehicle device, a position of the movable barrier; and
causing the communication circuitry to refrain from communicating the open command upon the position of the movable barrier stored in the memory indicating that the movable barrier is open.

16. The method of claim 11 further comprising:
storing, in a memory of the in-vehicle device, geofence data representative of a geofenced area;
determining a location of the vehicle using data from a sensor;
determining, via the processor of the in-vehicle device, that the vehicle is in proximity to the location associated with the movable barrier operator in response to the vehicle entering the geofenced area.

17. The method of claim 11 further comprising:
receiving, at a sensor, data from a global navigation satellite system;

determining, via the processor, whether the vehicle arrived at the location associated with the movable barrier operator; and wherein the vehicle arrival condition includes whether the vehicle arrived at the location associated with the movable barrier operator.

18. The method of claim 11 further comprising:

storing a vehicle parking routine in a memory of the in-vehicle device;

monitoring movement of the vehicle upon the vehicle being in proximity to the location associated with the movable barrier operator; and wherein the vehicle arrival condition includes whether the movement of the vehicle corresponds to the vehicle parking routine.

19. The method of claim 11 further comprising:

receiving, at a user interface of the in-vehicle device, a user input indicative of a vehicle destination; and wherein the vehicle arrival condition includes whether the vehicle destination corresponds to the location associated with the movable barrier operator.

20. The method of claim 11 wherein the vehicle arrival condition includes at least one of:

whether a distance of the vehicle from the location corresponds to an expected distance;

whether a speed of the vehicle corresponds to an expected speed; and whether a heading of the vehicle corresponds to an expected heading.

* * * * *